Patented May 17, 1949

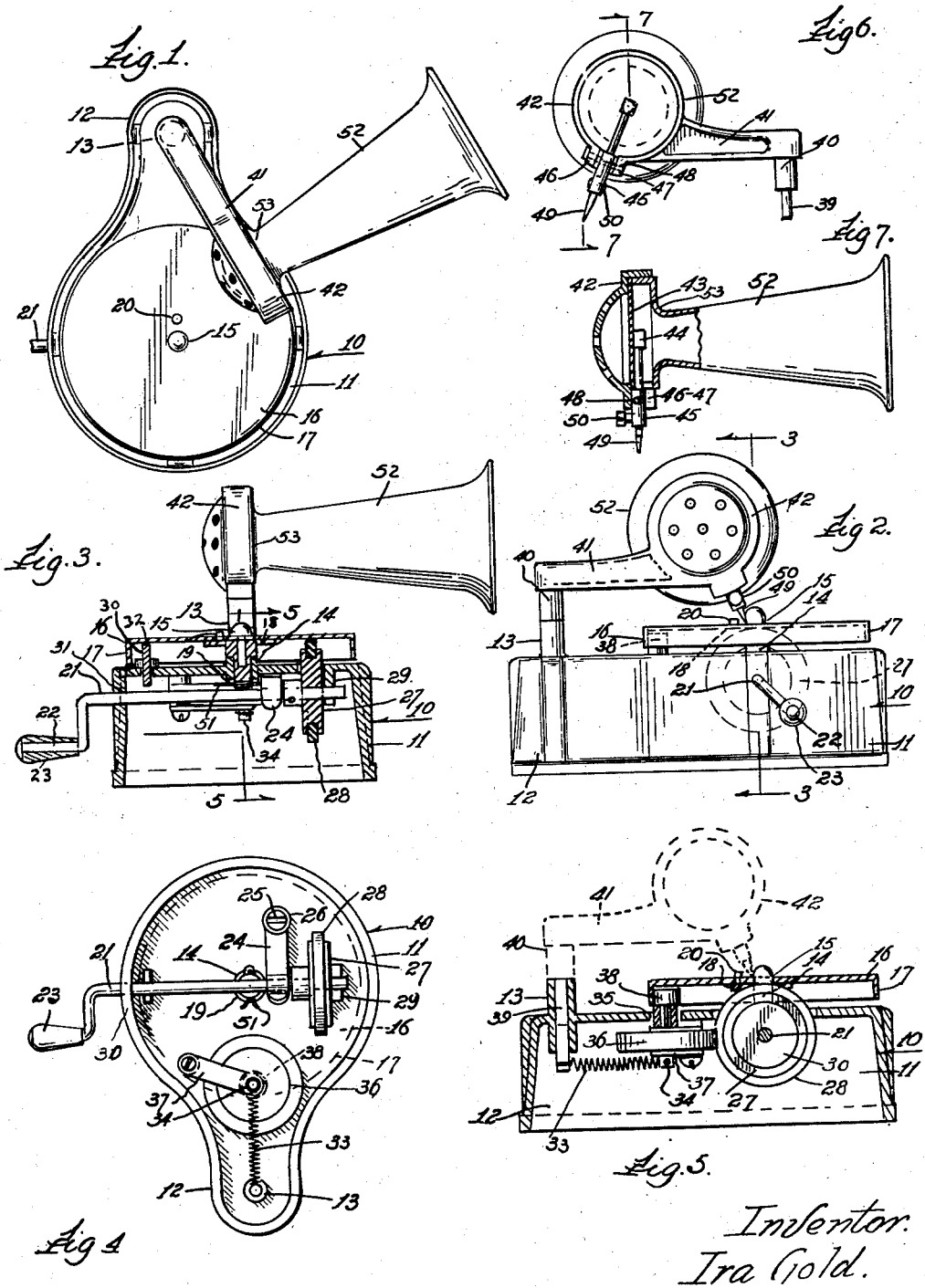

2,470,435

UNITED STATES PATENT OFFICE 2,470,435

MINIATURE TOY PHONOGRAPH

Ira Gold, Chicago, Ill., assignor to Atlas Toy Company, Chicago, Ill., a corporation of Illinois Application February 21, 1948, Serial No. 9,985

2 Claims. (Cl. 274—9)

My invention relates to a miniature hand operated toy phonograph for reproducing sound from records with volume and fidelity, for the entertainment and amusement of a child.

Among the objects of my invention are to provide a phonograph of reduced size, which may be operated by a child; to provide such a phonograph which will reproduce from grooved records voices or music for the entertainment or education of a child; to provide such a phonograph which is hand operated so as to impart to the child a feeling of accomplishment and skill in producing the sounds, and to provide such a device which is attractive in appearance, simple and fool proof in operation and economical of manufacture.

My invention also contemplates such other objects, advantages and capabilities as will later more fully appear, and which are inherently possessed by my invention.

While I have shown in the accompanying drawing a preferred form of my invention, yet it is understood that the same is susceptible of modification and change without departing from the spirit of my invention.

Referring to the drawings, Fig. 1 is a top plan view of my miniature toy phonograph; Fig. 2 is a side elevational view; Fig. 3 is a detailed sectional view of line 3—3 of Fig. 2; Fig. 4 is a bottom plan view; Fig. 5 is a detailed sectional view of the base and turntable on line 5—5 of Fig. 3, with the tone arm shown in dotted lines; Fig. 6 is a front view of the tone arm with the horn removed; and Fig. 7 is a detailed sectional view on line 7—7 of Fig. 6, with the horn in place.

A preferred embodiment of my invention comprises a hollow body member 10, which is preferably made of molded plastic. Body member 10 is approximately 2" high and has at one end a circular portion 11 having a diameter slightly in excess of 4". The other end of body member 10 forms a projection 12. Near the end of projection 12 is a pivot post 13, which extends upwardly from body member 10 and which has a hollow interior. Pivot post 13 also extends downwardly into the interior of body member 10.

Extending upwardly from the center of circular portion 11 of body member 10 is a hollow turntable post 14, which also extends into the interior of body member 10. Extending through turntable post 14 is a turntable shaft 15, which is attached to circular turntable 16. Turntable 16 may be formed of metal or plastic and has a diameter of approximately 4". Turntable 16 is of small thickness, and is turned down around its circumference to form an edge 17 which extends downwardly. The center portion 18 of turntable 16 is of greater thickness than the remainder so as to provide balance and evenness while turntable 16 is in rotation.

Mounted within the interior of body member 10 on the lower end of turntable post 14 is a metal washer 19, which surrounds turntable shaft 15. The end of turntable shaft 15 is provided with a small opening, through which extends a cotter pin 51, the ends of which are bent and which bear upon metal washer 19.

The top surface of turntable 16 is provided with a small guide pin 20 of smaller diameter than turntable shaft 15, and which is positioned a short distance therefrom. In operation, phonograph records used with my device must have a center opening to fit around turntable shaft 15, and a small opening to fit around guide pin 20. This prevents records placed upon turntable 16 from slipping while the turntable is in rotation.

Body member 10 is provided at one side with an opening through which extends a metal drive shaft 21, the outer end of which is bent to form a handle 22 having a rotatable hand grip 23. Drive shaft 21 is held within the hollow interior of body member 10 by a flat spring 24, one end of which extends across and is curved to fit and hold drive shaft 21, and the other end of which is held by a screw 25 to projection 26, which extends from the inside surface of body member 10. Flat spring 24 provides a continuous upward pressure against drive shaft 21.

Mounted on drive shaft 21 beyond flat spring 24 is a drive wheel 27, the outer circumferential edges of which provide a rim, in which is fitted a rubber covering 28. Drive wheel 27 extends through an opening in body member 10 and is of such a diameter that its rubber covering 28 contacts the bottom surface of turntable 16. The rotation of hand grip 23 on handle 22 thus causes the rotation of drive shaft 21, drive wheel 27 and turntable 16. Beyond drive wheel 27, drive shaft 21 terminates in a pair of shoulders 29, which extend downwardly from the inside of the top surface of body member 10.

Adjacent handle 22, wheel 30 is rotatably mounted on a projection 31, which extends upwardly from the top of body member 10. Wheel 30 is covered with a rubber tire 32, which contacts the bottom of turntable 16 to provide an additional point of support and balance for turntable 16.

Attached to the end of pivot post 13 within the interior of body member 10 is a coil spring 33. The other end of coil spring 33 is attached to a flywheel shaft 34, which extends upwardly through opening 35 in body member 10. Opening 35 is sufficiently large to permit flywheel shaft 34 to move a slight distance toward or away from pivot post 13. Mounted on flywheel shaft 34 are a flywheel 36 and an arm 37. Arm 37 extends at an angle of approximately 120° from coil spring 33, and is attached at its opposite end to the inside of the upper surface of body member 10. Mounted on flywheel shaft 34 directly above flywheel 36 is a rubber covered wheel 38. Wheel 38 contacts the inner surface of edge 17 of turntable 16 and is held there by coil spring 33 while turntable 16 is in rotation. Flywheel 36 thus serves as a governor to turntable 16 and aids its smooth rotation.

Adapted to fit within hollow opening of the upper portion of pivot post 13 is a metal pin 39, which is slightly smaller in diameter than the interior of pivot post 13. Metal pin 39 is mounted in the lower end of pin arm 40, the lower surface of which is adapted to rotate on the upper surface of pivot post 13. Extending at a right angle to pin arm 40 is tone arm 41, which is preferably formed of plastic. The end of tone arm 41 terminates in a circular portion 42. Mounted within circular portion 42 is a diaphragm 43, which is preferably formed of heavy paper or cardboard. Attached to the center of diaphragm 43 by gluing or other suitable means is a wooden vibrator 44, which contacts diaphragm 43 only at the center of the diaphragm, leaving the remainder of the diaphragm free to vibrate. Vibrator 44 extends past the edge of diaphragm 43, where it is enclosed in an aluminum sheath 45. Adjacent the edge of diaphragm 43 are two projections 46 and 47 on each side of vibrator 44. A holding pin 48 passes through projections 46 and 47 and through vibrator 44 and metal sheath 45 in order to hold vibrator 44 and sheath 45 from improper lateral movement. The bottom of vibrator 44 is provided with a small opening, which is adapted to receive a conventional phonograph needle 49. Near the end of vibrator 44 is an opening in which is mounted a set screw 50, which contacts and holds phonograph needle 49 in place.

A horn 52, which is preferably formed of plastic, terminates at its smaller end in a circular end portion 53, which is adapted to fit within the circular portion 42 of tone arm 41. Circular end portion 53 is sealed within circular portion 43, exerting a continuous pressure against the entire circumference of diaphragm 43. The back of circular portion 42 is convex and is provided with a plurality of openings. In operation, vibrations pass from a grooved phonograph record to phonograph needle 49 and in turn to vibrator 44. Vibrator 44 causes these vibrations to be imparted to diaphragm 43, the movement of which results in movements of the surrounding air and the creation of sound waves, which pass through and are given direction by horn 52 and circular portion 42. The entire tone arm and horn assembly pivots on pivot post 13 so as to follow needle 49 as it passes across turntable 16.

In operation, my miniature toy phonograph is assembled by placing metal pin 39 in pivot post 13. A grooved phonograph record is then placed on turntable 16. Needle 49 is placed in the outside groove of the phonograph record opposite handle 22. The user then grasps hand grip 23 and turns handle 22. This causes the rotation of turntable 16, which is balanced at three points so that it will not tip or rock. As turntable 16 rotates, the grooves on the phonograph record cause needle 49 to vibrate, and its vibrations are conveyed to diaphragm 43. Diaphragm 43 causes the surrounding air to vibrate and creates sound waves which pass through horn 52 and the back of circular portion 42 to the listener.

My miniature toy phonograph is so simple in operation that a small child may easily learn to use it properly. Through its use, a child may play nursery rhymes or simple music for its amusement, listen to stories, or learn arithmetic tables or other school lessons in a way which is attractive and interesting.

Having thus described my invention, I claim:

1. A miniature toy phonograph comprising a base having a hollow interior, a circular turntable rotatably mounted on said base, said turntable having a downturned edge around its circumference, said turntable adapted to receive and hold a grooved phonograph record, a drive shaft mounted within said base beneath said turntable, said drive shaft having on one end a hand crank extending outwardly from said base, said hand crank manually operable to rotate said drive shaft, a drive wheel fixedly mounted on said drive shaft with its outer edge contacting the lower surface of said turntable, a flat spring mounted within said base, adjacent said drive shaft, said flat spring having one end extending over said drive shaft to hold said drive shaft within said base, a coil spring within said base attached at one end to said base and at its other end to a flywheel shaft, a flywheel mounted on said flywheel shaft within said base and a balance wheel mounted on said flywheel shaft above said base, the outer edge of said balance wheel contacting the inside of the downturned edge of said turntable, said flywheel shaft extending through an opening in said base sufficiently large to permit slight lateral movement of said flywheel shaft, an arm attached at one end to said flywheel shaft and at its other end to said base, said arm adapted to act as a pivot for the movement of said flywheel shaft, a roller wheel mounted on said base beneath said turntable and adjacent said handle having its edge contacting the lower surface of said turntable, said drive shaft, drive wheel, turntable, flywheel, balance wheel and roller wheel adapted to rotate upon the manual operation of said handle, an arm pivotally mounted on said base, said arm having a circular end portion, a paper diaphragm mounted in said circular end portion, a wooden vibrator attached at one end to the center of said diaphragm, said vibrator extending radially from the center of said diaphragm at a sufficient distance therefrom to permit vibration of said diaphragm, said vibrator having its other end mounted in said arm and adapted to receive and hold a phonograph needle, a horn mounted in said circular end portion of said arm over the outer edge of said diaphragm, said vibrator, diaphragm and horn adapted to receive through a phonograph needle vibrations from a phonograph record on said turntable as said turntable is rotated and to convert said vibrations into audible sound waves.

2. A miniature toy phonograph comprising a base having a hollow interior, a circular turntable rotatably mounted on said base, said turntable having a downturned edge around its circumference, said turntable adapted to receive and hold a grooved phonograph record, a drive shaft mounted within said base beneath said turntable, said driveshaft having on one end a hand crank manually operable from outside said base to rotate said drive shaft, a drive wheel mounted on said drive shaft with its outer edge contacting the lower surface of said turntable, a flywheel shaft extending through an opening in said base beneath said turntable, a flywheel mounted on said shaft within said base and a balance wheel mounted on said shaft above said base and beneath said turntable, said balance wheel having its outer edge in contact with the inside of the downturned edge of said turntable, said drive shaft, drive wheel, turntable, flywheel and balance wheel adapted to rotate upon the manual operation of said hand crank, an arm pivotally mounted on said base, said arm having a circular end portion, a paper diaphragm mounted in said circular end portion, a vibrator attached at one end to the center of said diaphragm and extending radially from the center of said diaphragm at a sufficient distance therefrom to permit vibration of said diaphragm, said vibrator having its other end mounted in said arm, and adapted to receive and hold a phonograph needle, a horn mounted on said arm adjacent said diaphragm, said vibrator, diaphragm and horn adapted to receive through a phonograph needle vibrations from a grooved phonograph record on said turntable as said turntable is rotated, and to convert said vibrations into audible sound waves.

IRA GOLD.

REFERENCES CITED

The following references are of record in the file of this patent:

UNITED STATES PATENTS

| Number | Name | Date |
|---|---|---|
| 601,198 | Johnson | Mar. 22, 1898 |